United States Patent
Kim et al.

(10) Patent No.: US 8,866,732 B2
(45) Date of Patent: Oct. 21, 2014

(54) DISPLAY PANEL AND DISPLAY APPARATUS HAVING THE SAME

(75) Inventors: Ji-Sun Kim, Seoul (KR); Seongyoung Lee, Anyang-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 1076 days.

(21) Appl. No.: 12/820,619

(22) Filed: Jun. 22, 2010

(65) Prior Publication Data

US 2011/0181502 A1  Jul. 28, 2011

(30) Foreign Application Priority Data

Jan. 26, 2010 (KR) .................. 10-2010-0007073

(51) Int. Cl.
G09G 3/34 (2006.01)
G02F 1/167 (2006.01)
G09G 3/20 (2006.01)

(52) U.S. Cl.
CPC .............. G09G 3/344 (2013.01); G02F 1/167 (2013.01); G02F 2001/1676 (2013.01); G09G 3/2003 (2013.01); G09G 2300/0439 (2013.01); G09G 2300/08 (2013.01)
USPC ......................................... 345/107; 359/296

(58) Field of Classification Search
USPC .......................................... 345/107; 359/296
See application file for complete search history.

(56) References Cited

U.S. PATENT DOCUMENTS

| 6,700,075 B2 | 3/2004 | Gordon |
| 6,741,385 B2* | 5/2004 | Ikeda et al. ................... 359/296 |
| 6,967,762 B2* | 11/2005 | Machida et al. .............. 359/296 |
| 7,548,291 B2 | 6/2009 | Lee et al. |
| 2007/0262309 A1 | 11/2007 | Kim |
| 2008/0037106 A1* | 2/2008 | Song .............................. 359/296 |
| 2008/0174851 A1* | 7/2008 | Kawai et al. .................. 359/296 |
| 2008/0278435 A1* | 11/2008 | Song et al. ..................... 345/107 |
| 2010/0007941 A1* | 1/2010 | Abe et al. ....................... 359/296 |

FOREIGN PATENT DOCUMENTS

| JP | 2001-249366 | 9/2001 |
| JP | 2002-174828 | 6/2002 |
| JP | 2007-140440 | 6/2007 |
| KR | 1020080015239 | 2/2008 |
| KR | 1020080099541 | 11/2008 |
| KR | 1020090073887 | 7/2009 |

OTHER PUBLICATIONS

Office Action dated Nov. 1, 2011 for U.S. Appl. No. 12/558,075.

* cited by examiner

Primary Examiner — Latanya Bibbins
(74) Attorney, Agent, or Firm — F. Chau & Associates, LLC

(57) ABSTRACT

A display panel includes a first substrate, a second substrate, an electrophoretic layer, and a shielding electrode. The first substrate includes a first base substrate and pixel electrodes disposed on the first base substrate. The second substrate includes a second base substrate and a common electrode disposed on the second base substrate to face the pixel electrodes. The electrophoretic layer is disposed between the first substrate and the second substrate to display a gray-scale image. The shielding electrode is disposed between the pixel electrodes and faces the common electrode with the electrophoretic layer interposed between the shielding electrode and the common electrode to receive a voltage corresponding to a black gray-scale.

22 Claims, 5 Drawing Sheets

DISPLAY PANEL AND DISPLAY APPARATUS HAVING THE SAME

CROSS-REFERENCE TO RELATED APPLICATION

This application claims priority to Korean Patent Application No. 2010-7073 filed on Jan. 26, 2010, the contents of which are herein incorporated by reference in its entirety. This application is related to U.S. Pat. application Ser. No. 12/558,075, filed on Sep. 11, 2009, which is commonly owned by the assignee of the instant application.

BACKGROUND

1. Technical Field

The present invention relates to a display panel and a display apparatus having the display panel. More particularly, the present invention relates to a display panel capable of improving display properties thereof and a display apparatus having the display panel.

2. Discussion of the Related Art

In general, an electrophoretic display includes a lower substrate, an upper substrate, and pigment particles disposed between the lower substrate and the upper substrate. The pigment particles move to the lower or upper substrate according to an electric field formed between the lower and upper substrates. As described above, a phenomenon that electrified particles move along the electric field is called an electrophoretic phenomenon, and the electrophoretic display displays an image using the electrophoretic phenomenon. Particularly, since the electrophoretic display displays the image using external light, the electrophoretic display does not require a separate light source. In addition, the pigment particles are formed in a thin layer, so that the electrophoretic display is thin and lightweight.

The electrophoretic display includes a plurality of pixel electrodes each receiving a pixel voltage. However, a fringe field is generated at a boundary portion between two adjacent pixel electrodes, thereby causing electric field interference between the adjacent two pixel electrodes. As a result, the electric field interference exerts an influence on the electrified particles, so that color mixing phenomenon occurs and color reproducibility deteriorates.

SUMMARY

Embodiments of the present invention provide a display panel capable of improving display properties, and a display apparatus having the display panel.

According to an embodiment, a display panel includes a first substrate, a second substrate, an electrophoretic layer, and a shielding electrode.

The first substrate includes a first base substrate and pixel electrodes disposed on the first base substrate, and the second substrate includes a second base substrate and a common electrode disposed on the second base substrate to face the pixel electrodes. The electrophoretic layer is disposed between the first substrate and the second substrate to display a gray-scale image. The shielding electrode is disposed between the pixel electrodes and faces the common electrode with the electrophoretic layer interposed between the shielding electrode and the common electrode to receive a voltage corresponding to a black gray-scale.

According to an embodiment, a display apparatus includes a data driver, a gate driver, and a display panel.

The data driver receives an image signal and a data control signal to output a data signal and the gate driver receives a gate control signal to output a gate signal. The display panel displays an image in response to the gate signal and the data signal and includes a first substrate, a second substrate, an electrophoretic layer, and a shielding layer.

The first substrate includes a first base substrate and pixel electrodes disposed on the first base substrate, and the second substrate includes a second base substrate and a common electrode disposed on the second base substrate to face the pixel electrodes. The electrophoretic layer is disposed between the first substrate and the second substrate to display a gray-scale image. The shielding electrode is disposed between the pixel electrodes and faces the common electrode with the electrophoretic layer interposed between the shielding electrode and the common electrode to receive a voltage corresponding to a black gray-scale.

According to the above, the shielding electrode is disposed between the pixel electrodes and receives a voltage corresponding to a black gray-scale. Thus, electrophoretic particles disposed between the pixel electrodes display the black gray-scale image, thereby preventing occurrence of color mixing phenomenon and deterioration of color reproducibility, which are caused by the electrophoretic particles disposed between the pixel electrodes.

BRIEF DESCRIPTION OF THE DRAWINGS

The embodiments of the present invention will become readily apparent by reference to the following detailed description when considered in conjunction with the accompanying drawings wherein.

DESCRIPTION OF THE EMBODIMENTS

It will be understood that when an element or layer is referred to as being "on", "connected to" or "coupled to" another element or layer, it can be directly on, connected or coupled to the other element or layer or intervening elements or layers may be present. Like numbers may refer to like elements throughout the drawings and the specification.

Figure 1:
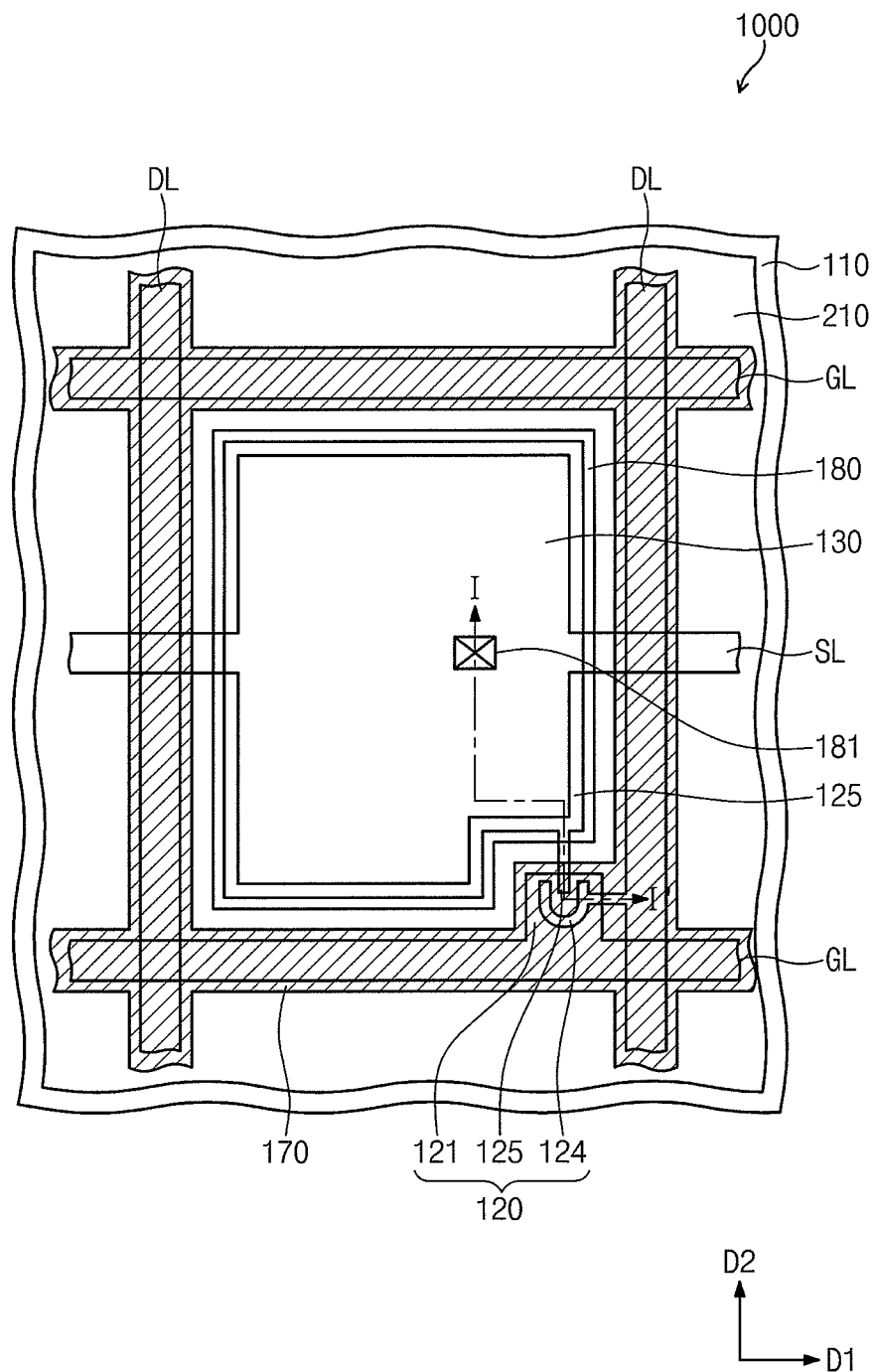
FIG. 1 is a plan view showing an electrophoretic display panel according to an exemplary embodiment of the present invention.
Figure 2:
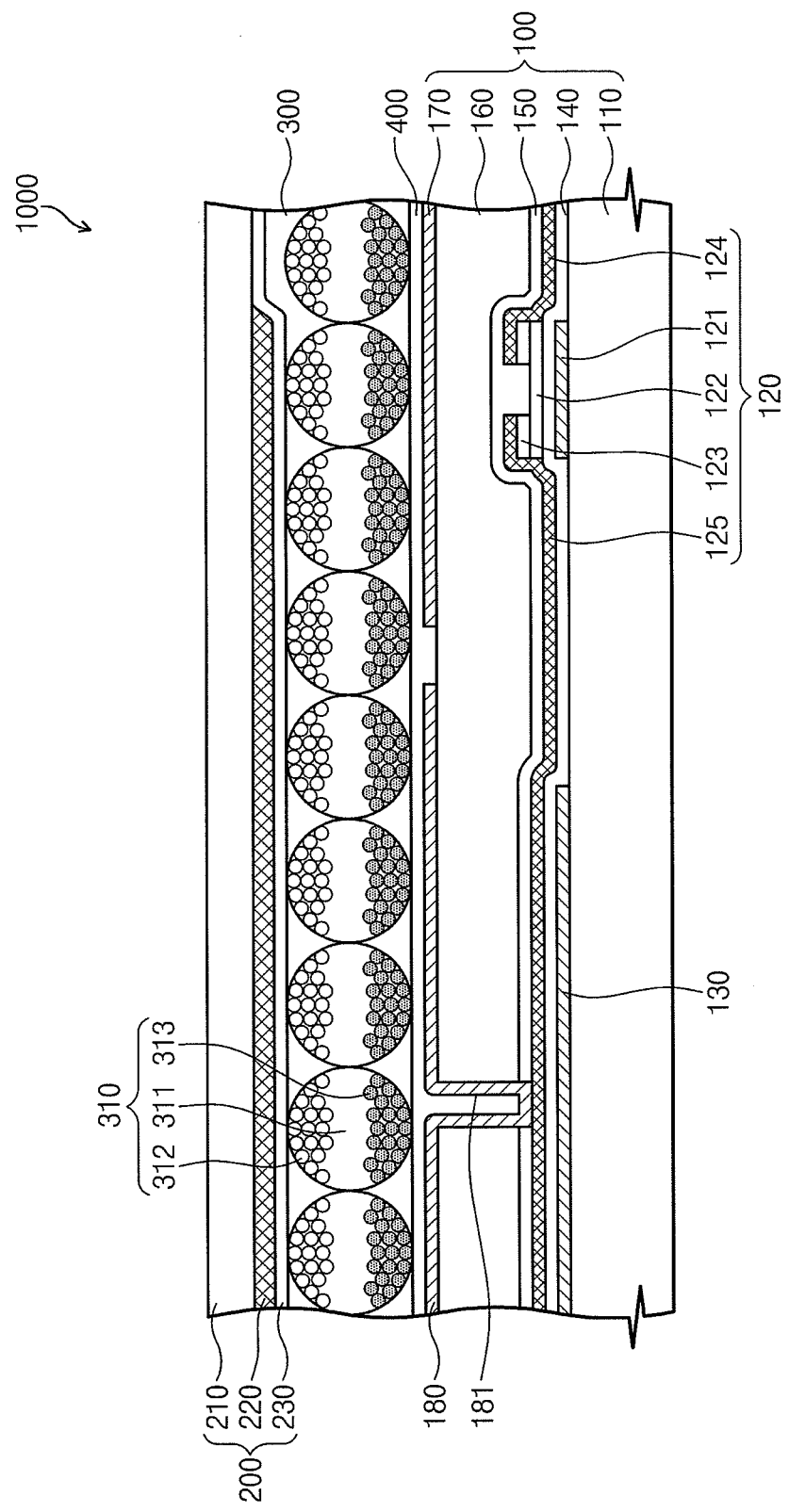
FIG. 2 is a cross-sectional view taken along a line I-I' of FIG. 1.

FIG. 1 is a plan view showing an electrophoretic display panel according to an exemplary embodiment of the present invention, and FIG. 2 is a cross-sectional view taken along a line I-I' of FIG. 1.

Referring to FIGS. 1 and 2, an electrophoretic display panel 1000 includes a first substrate 100 and a second substrate 200. The first substrate 100 includes a first base substrate 110 and a plurality of pixels formed on the first base substrate 110. Each of the pixels includes a thin film transistor 120 and a pixel electrode 180. According to an exemplary embodiment, since the pixels have the same structure and function, for the convenience of explanation, one pixel will be described in detail with reference to FIG. 1 as a representative example.

The first base substrate 110 of the first substrate 100 includes a gate line GL and a data line DL insulated from the gate line GL while crossing the gate line GL. The gate line GL and the data line DL are disposed on the first base substrate 110. The first base substrate 110 may further include a storage line SL thereon and the storage line SL is insulated from the data line DL while crossing the data line DL. The gate line GL extends in a first direction D1 and the storage line SL extends in the first direction D1 and is spaced apart from the gate line GL by a predetermined distance. The data line DL extends in a second direction D2 substantially perpendicular to the first direction D1. Although not shown in FIGS. 1 and 2, an insulating layer may be disposed between the gate line GL and the data line DL and between the storage line SL and the data line DL.

The thin film transistor 120 includes a gate electrode 121, a source electrode 124, and a drain electrode 125 and is electrically connected to the gate line GL and the data line DL. In detail, the gate electrode 121 branches from the gate line GL, the source electrode 124 branches from the data line DL, and the drain electrode 125 is spaced apart from the source electrode 124 by a predetermined distance and electrically connected to the pixel electrode 180 through a contact hole 181.

The first substrate 100 may include a storage electrode 130. The storage electrode 130 branches from the storage line SL. The storage electrode 130 faces the drain electrode 125 to form an electric field.

The first base substrate 110 further includes a shielding electrode 170 between two adjacent pixel electrodes. The shielding electrode 170 is made of a conductive material and electrically insulated from the pixel electrode 180 while spaced apart from the pixel electrode 180. According to an exemplary embodiment, a portion of the shielding electrode 170 may be disposed above the data line DL or the gate line GL.

In addition, the shielding electrode 170 may be disposed to cover an upper portion of the thin film transistor 120. In this case, although not shown in FIGS. 1 and 2, if a user recognizes that an image is displayed in an undesired pixel area due to defects in wires or the pixel area, the pixel area displaying the undesired image may be transferred to a non-display area displaying no image by making a short circuit between the drain electrode 125 of the thin film transistor 120 and the shielding electrode 170.

Arrangements of the pixel electrode 180, the shielding electrode 170, the data line DL, the gate line GL, and the thin film transistor 120 may be configured in various ways.

Referring to FIG. 2, the electrophoretic display panel 1000 includes the first substrate 100, the second substrate 200 facing the first substrate 100, and an electrophoretic layer 300 disposed between the first substrate 100 and the second substrate 200.

The gate electrode 121 and the storage electrode 130 are arranged on the first base substrate 110 of the first substrate 100. The gate electrode 121 and the storage electrode 130 are covered by an insulating layer 140. An active layer 122 and an ohmic contact layer 123 are disposed on the insulating layer 140 corresponding to an area in which the gate electrode 121 is formed. Thus, a portion of the source electrode 124 and the drain electrode 125 faces the gate electrode 121 with the insulating layer 140, the active layer 122, and the ohmic contact layer 123 interposed between the gate electrode 121 and the portion of the source electrode 124 and the drain electrode 125.

The thin film transistor 120 may be covered by a protection layer 150, and an organic insulating layer 160 may be further disposed on the protection layer 150.

The protection layer 150 and the organic insulating layer 160 are provided with a contact hole 181 to expose a portion of the drain electrode 125 of the thin film transistor 120. The pixel electrode 180 is formed on the organic insulating layer 160 and electrically connected to the drain electrode 125 through the contact hole 181.

The second substrate 200 includes a second base substrate 210, a color filter 220, and a common electrode 230. The second base substrate 210 may include a flexible material, such as polyethylene terephthalate (PET), fiber reinforced plastic, or polyethylene naphthalate (PEN).

The color filter 220 is disposed below the second base substrate 210. The color filter 220 may include a plurality of color pixels (not shown). The color pixels are arranged to respectively correspond with the pixel areas, and each color pixel has a predetermined color. The color pixels display colors using light reflected from the electrophoretic layer 300, thereby displaying desired images.

The common electrode 233 is disposed below the color filter 220. The common electrode 230 is arranged between the color filter 220 and the electrophoretic layer 300 to receive a common voltage. The common electrode 230 includes a transparent conductive material such that light incident to the second base substrate 210 from the exterior may be provided to the electrophoretic layer 300.

The electrophoretic layer 300 may include a plurality of microcapsules 310 each having a spherical shape. Each microcapsule 310 has a diameter approximate to that of a strand of human hair. Each microcapsule 310 includes a transparent insulative liquid 311, and a plurality of first particles 312 and second particles 313 dispersed in the liquid 311. The first particles 312 are electrified to have a polarity and a color, which are different from those of the second particles 313.

As an example, the first particles 312 are electrified to have a positive (+) polarity and include a material, such as titanium dioxide ($TiO_2$), to have a white color. The second particles 313 are electrified to have a negative polarity (−) and include carbon powder, such as carbon black, to have a black color. The first and second particles 312 and 313 move according to an electric field generated between the first substrate 100 and the second substrate 200. The electric field generated between the first substrate 100 and the second substrate 200 may be varied by a pixel voltage applied to the pixel electrode 180. Accordingly, positions of the first and second particles 312 and 313 are decided according to the pixel voltage.

For instance, when the pixel electrode 180 has the positive (+) polarity, the second particles 313 move to the first substrate 100 and the first particles 312 move to the second substrate 200. On the contrary, when the pixel electrode 180 has the negative (−) polarity, the second particles 313 move to the second substrate 200 and the first particles 312 move to the first substrate 100.

The number of the first and second particles 312 and 313 moving to the first substrate 100 or the second substrate 200 in the electrophoretic layer 300 depends on the level of the pixel voltage applied to the pixel electrode 180. The gray-scale level of the pixel area is determined according to the amount of the first and second particles 312 and 313 that are moved. The color pixels of the color filter 220 display colors using light reflected by the first and second particles 312 and 313, thereby displaying images.

The electrophoretic display panel 1000 may further include an adhesive member 400 to attach the electrophoretic layer 300 to the first substrate 100. The adhesive member 400 is disposed between the elecrophoretic layer 300 and the first substrate 100, thereby attaching the electrophoretic layer 300 to the first substrate 100.

The shielding electrode 170 is disposed on the organic insulating layer 160 and spaced apart from the pixel electrode 180, and thus the shielding electrode 170 may be electrically insulated from the pixel electrode 180. In the present exemplary embodiment, the shielding electrode 170 may be made of a conductive material same as the pixel electrode 180. The shielding electrode 170 faces the common electrode 230 with the electrophoretic layer 300 between the shielding electrode 170 and the common electrode 230. The shielding electrode 170 receives a voltage corresponding to a black gray-scale level and having the same polarity as that of black-colored particles among the first and second particles 312 and 313.

If the voltage corresponding to the black gray-scale level is applied to the shielding electrode 170, the microcapsules 310 disposed above the shielding electrode 170 absorb the light from the exterior. Thus, the shielding electrode 170 absorbs and shields light incident into an area between two adjacent pixel electrodes, i.e., an area in which the pixel electrode 180 is not formed, thereby preventing occurrence of color mixing phenomenon and deterioration of color reproducibility. In addition, the shielding electrode 170 may prevent an electric field generated by the data line DL and the gate line GL from affecting the electrophoretic layer 300.

Figure 3:
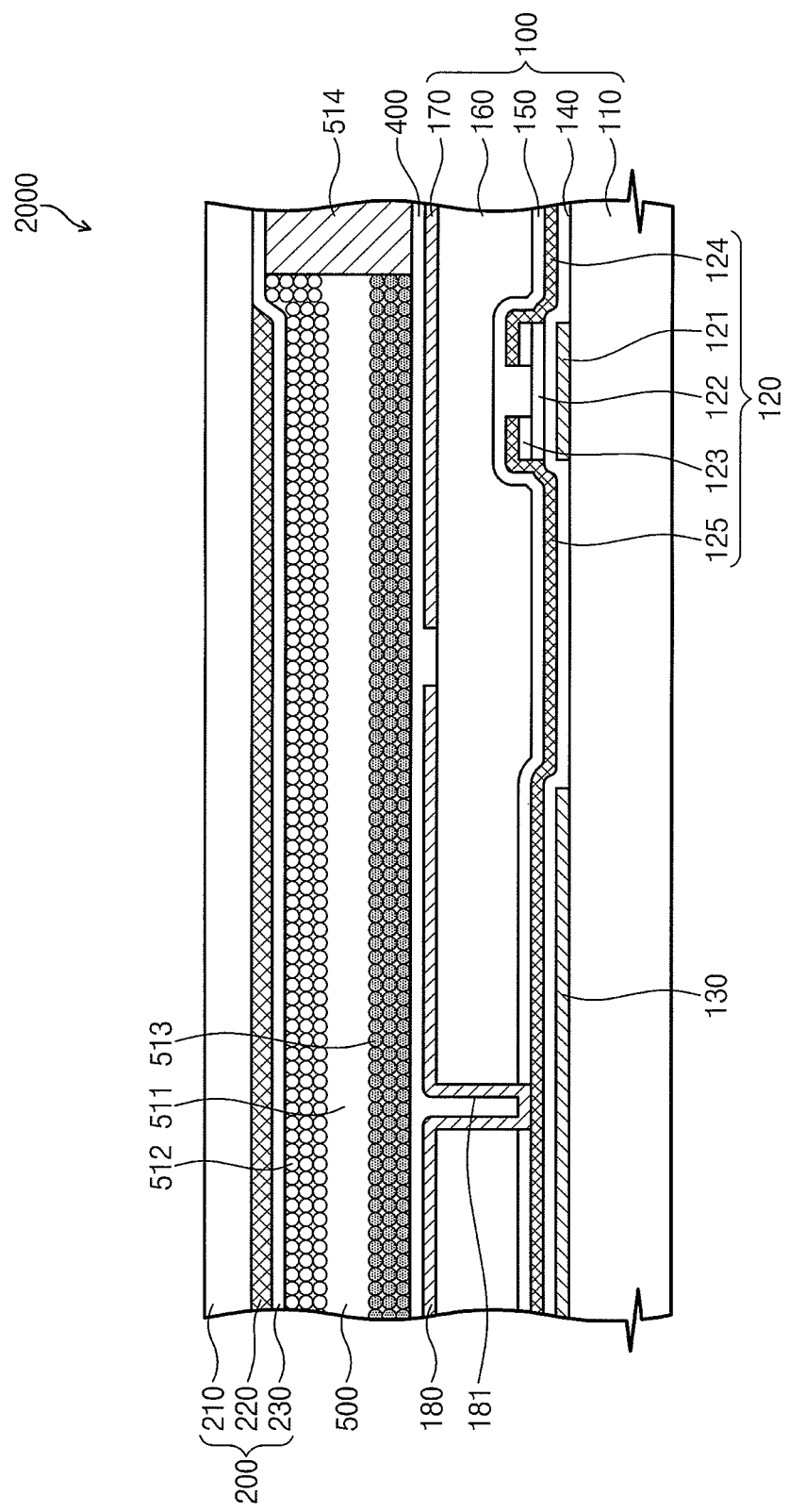
FIG. 3 is a cross-sectional view showing an electrophoretic display panel according to an exemplary embodiment of the present invention.

FIG. 3 is a cross-sectional view showing an electrophoretic display panel according to an exemplary embodiment of the present invention.

Referring to FIG. 3, an electrophoretic display panel 2000 has the same structure and function as those of the electrophoretic display panel 1000 shown in FIG. 2 except for an electrophoretic layer 500. Therefore, in the detailed description of the electrophoretic display panel 2000, the same elements in FIG. 3 as in FIG. 2 will be assigned the same reference numerals and detailed descriptions of the same elements will be omitted.

The electrophoretic display panel 2000 includes a first substrate 100, a second substrate 200 facing the first substrate 100, and an electrophoretic layer 500 between the first substrate 100 and the second substrate 200.

The first substrate 100 includes a first base substrate 110, a thin film transistor 120, and a pixel electrode 180. The first substrate 100 may further include a storage electrode 130.

The second substrate 200 includes a second base substrate 210, a color filter 220 disposed below the second base substrate 210, and a common electrode 230 disposed below the color filter 220.

The electrophoretic layer 500 includes a transparent insulative liquid 511, a plurality of first particles 512 and second particles 513 dispersed in the liquid 511, and a barrier wall 514.

The barrier wall 514 is positioned to space the first substrate 100 apart from the second substrate 200 for accommodating the liquid 511, the first particles 512, and the second particles 513. Although not shown in FIG. 3, a plurality of the barrier walls 514 may be provided and each barrier wall 514 surrounds a corresponding pixel, thereby preventing the liquid 511, the first particles 512, and the second particles 513 from moving between the two adjacent pixel areas.

Figure 4:
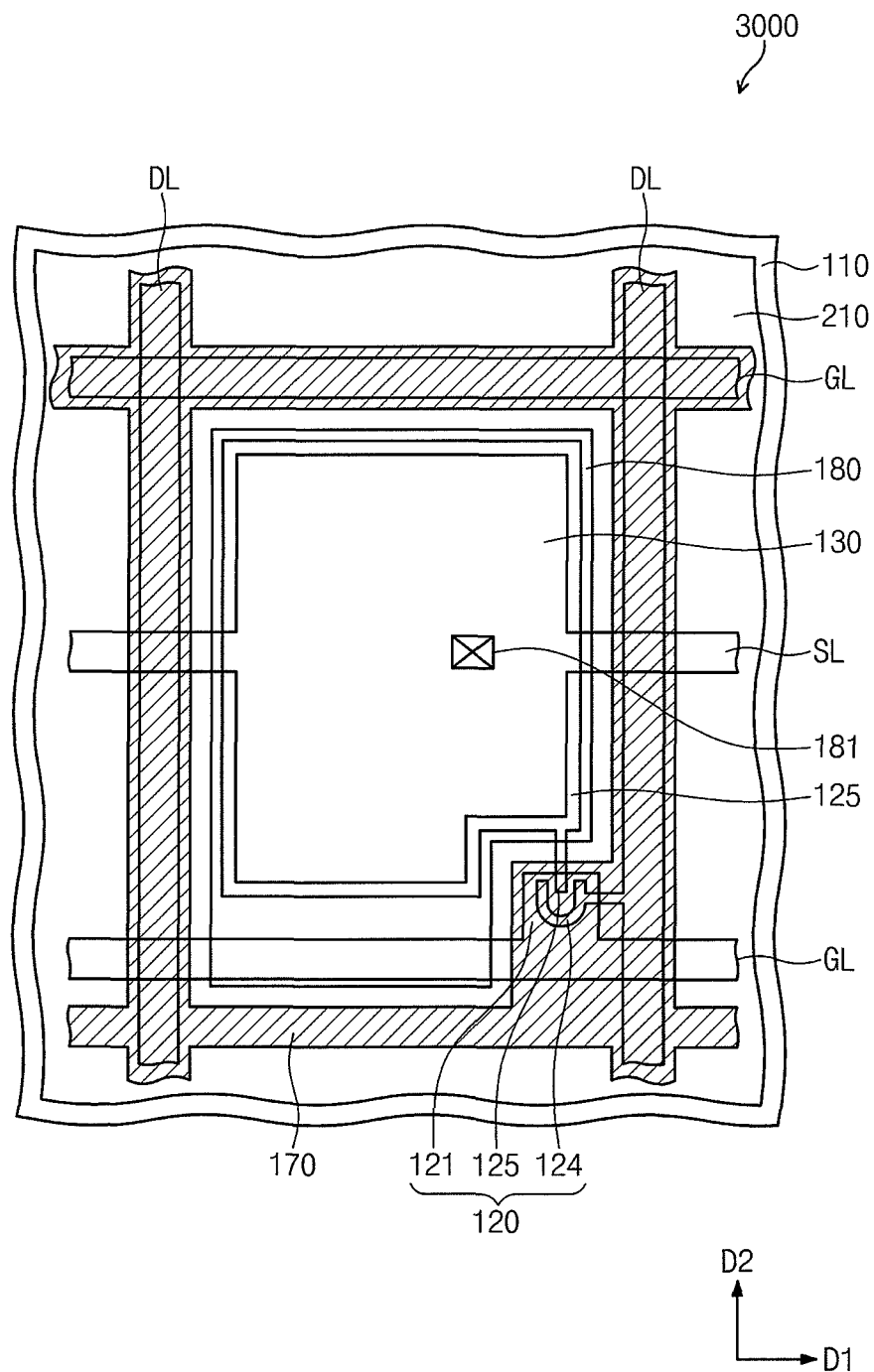
FIG. 4 is a plan view showing an electrophoretic display panel according to another exemplary embodiment of the present invention.

FIG. 4 is a plan view showing an electrophoretic display panel according to another exemplary embodiment of the present invention.

Referring to FIG. 4, an electrophoretic display panel 3000 has the same structure and function as those of the electrophoretic display panel 1000 shown in FIG. 1 except for the pixel electrode 180 and the gate line GL. Therefore, in the detailed description of the electrophoretic display panel 3000, the same elements in FIG. 4 as in FIG. 1 will be assigned the same reference numerals and detailed descriptions of the same elements will be omitted.

According to an exemplary embodiment shown in FIG. 4, the pixel electrode 180 is extended to cover the gate line GL. In this case, although the shielding electrode 170 is disposed between two adjacent pixel electrodes, the shielding electrode 170 may not cover the gate line GL.

Figure 5:
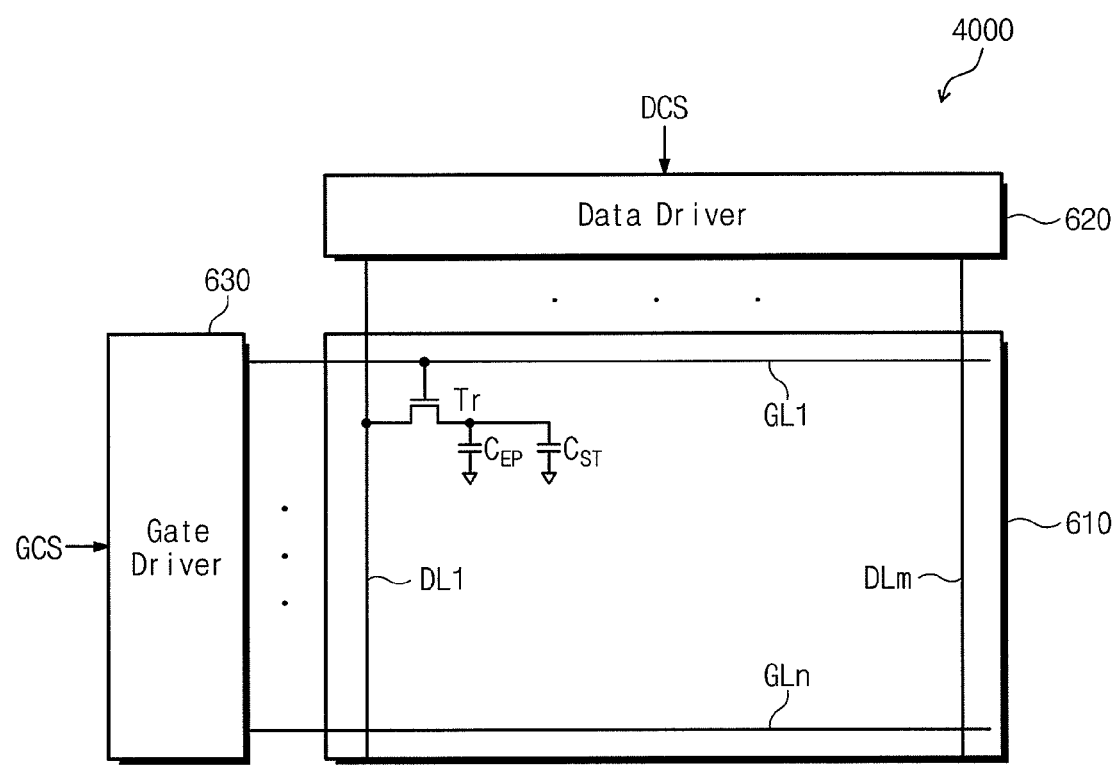
FIG. 5 is a plan view showing a display apparatus employing an electrophoretic display panel according to an exemplary embodiment of the present invention.

FIG. 5 is a plan view showing a display apparatus employing an electrophoretic display panel according to an exemplary embodiment of the present invention.

Referring to FIG. 5, an electrophoretic display 4000 includes an electrophoretic display panel 610, a data driver 620, and a gate driver 630.

In response to a gate control signal GCS from an external source, the gate driver 630 sequentially applies a gate signal to gate lines GL1~GLn of the electrophoretic display panel 610 to sequentially scan the gate lines GL1~GLn.

The data driver 640 generates a plurality of gray-scale voltages using gamma voltages provided from a gamma voltage generator (not shown). The data driver 640 selects some of the generated gray-scale voltages in response to a data control signal DCS and outputs the selected gray-scale voltages to data lines DL1~DLm of the electrophoretic display panel 610 as data signals.

The electrophoretic display panel 610 includes the gate lines GL1~GLn, the data lines DL1~DLm crossing the gate lines GL1~GLn, and pixels. The electrophoretic display panel 610 may further include a plurality of storage lines (not shown) to which a common voltage is applied.

Since the pixels have the same structure and function, for the convenience of explanation, one pixel has been described in FIG. 5. Each pixel includes a thin film transistor Tr that includes a gate electrode connected to a corresponding gate line of the gate lines GL1~GLn, a source electrode connected to a corresponding data line of the data lines DL1~DLm, and a drain electrode. In addition, each pixel includes an electrophoretic capacitor $C_{EP}$ and a storage capacitor $C_{ST}$, which are connected to the drain electrode of the thin film transistor Tr.

If the gate signal is sequentially applied to the gate lines GL1~GLn, the data signals are applied to the data lines DL1~DLm. If a corresponding gate signal is applied to a selected gate line, the thin film transistor Tr connected to the selected gate line is turned on in response to the gate signal applied to the selected gate line. If the data signal is applied to the data line connected to the turned-on thin film transistor, the data signal is charged to the electrophoretic capacitor $C_{EP}$ and the storage capacitor $C_{ST}$ through the turned-on thin film transistor Tr. The electrophoretic capacitor $C_{EP}$ controls the light reflectance of the electrophoretic layer according to the charged voltage.

The storage capacitor $C_{ST}$ is charged with the data signal while the thin film transistor Tr is turned on and applies the charged data signal to the electrophoretic capacitor $C_{EP}$ while the thin film transistor Tr is turned off, thereby maintaining the charge of the electrophoretic capacitor $C_{EP}$. Thus, the electrophoretic display panel 610 may display an image.

Although not shown in FIG. 5, referring back to FIG. 2, the shielding electrode 170 receives a voltage having the same polarity as that of black-colored particles of the first particles 312 and 512 or the second particles 313 and 513 of the electrophoretic layer 300.

As a method of applying a voltage to the shielding electrode 170, the shielding electrode 170 may be connected to the data driver 620, so that the data driver 620 may apply a predetermined voltage to the shielding electrode 170.

As another method, the shielding electrode 170 may be connected to the gate driver 630 and the gate driver 630 may apply the gate signal to the shielding electrode 170 as the voltage. During one frame, the gate signal of a positive (+) polarity is applied only when thin film transistors included in a specific line are driven and gate signals of a negative (−) polarity are applied when thin film transistors included in the other lines are driven, and thus the gate signal may be used as the voltage applied to the shielding electrode 170.

As another method, the electrophoretic display 4000 may include a separate shielding voltage generator (not shown). The shielding voltage generator is electrically connected to the shielding electrode 170 and receives an external voltage to generate the voltage applied to the shielding electrode 170.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display panel comprising:
   a first substrate including a first base substrate and pixel electrodes disposed on the first base substrate, wherein at least one pixel electrode of the pixel electrodes is connected with a drain electrode of a thin film transistor disposed on the first substrate;
   a second substrate including a second base substrate and a common electrode disposed on the second base substrate;
   an electrophoretic layer disposed between the first substrate and the second substrate to display a gray-scale image; and
   a shielding electrode disposed between the pixel electrodes, the shielding electrode facing the common electrode with the electrophoretic layer interposed between the shielding electrode and the common electrode, the shielding electrode not connected with the drain electrode of the thin film transistor, wherein a black gray scale voltage is applied to the shielding electrode, and wherein the shielding electrode is connected with a driver configured to drive the thin film transistor.

2. The display panel of claim 1, wherein the first substrate further comprises:
   a gate line arranged on the first base substrate;
   a data line insulated from the gate line and crossing the gate line;
   a plurality of switching devices each electrically connected to a respective gate line and a respective data line; and
   an insulating layer arranged on the switching devices and the data line,
   wherein the pixel electrodes are disposed on the insulating layer and electrically connected to the switching devices, respectively, and the shielding electrode is electrically insulated from the pixel electrodes and disposed on the insulating layer.

3. The display panel of claim 2, wherein the data line is disposed below the shielding electrode.

4. The display panel of claim 2, wherein the gate line is disposed below the shielding electrode.

5. The display panel of claim 2, wherein the switching devices are covered by the shielding electrode.

6. The display panel of claim 1, wherein the shielding electrode comprises a same material as the pixel electrodes.

7. The display panel of claim 1, wherein the electrophoretic layer comprises a plurality of microcapsules each comprising a transparent insulative liquid having a spherical shape, a plurality of first particles, and a plurality of second particles having a polarity different from a polarity of the first particles.

8. The display panel of claim 7, wherein the black gray scale voltage has the same polarity as a polarity of black-colored particles of the plurality of first particles or the plurality of second particles.

9. The display panel of claim 1, wherein the etectrophoretic layer comprises a transparent insulative liquid, a plurality of first particles, a plurality of second particles having a polarity different from a polarity of the first particles, and a plurality of barrier walls.

10. The display panel of claim 9, wherein the shielding electrode receives a voltage having the same polarity as a polarity of black-colored particles of the first particles or the second particles.

11. A display apparatus comprising:
   a data driver that receives an image signal and a data control signal and outputs a data signal;
   a gate driver that receives a gate control signal and outputs a gate signal; and
   a display panel that displays an image in response to the gate signal and the data signal,
   wherein the display panel comprises:
      a first substrate including a first base substrate and pixel electrodes disposed on the first base substrate, wherein at least one pixel electrode of the pixel electrodes is connected with a drain electrode of a thin film transistor disposed on the first substrate;
      a second substrate including a second base substrate and a common electrode disposed on the second base substrate;
      an electrophoretic layer disposed between the first substrate and the second substrate to display a gray-scale image; and
      a shielding electrode disposed between the pixel electrodes, the shielding electrode facing the common electrode with the electrophoretic layer between the shielding electrode and the common electrode, the shielding electrode not connected with the drain electrode of the thin film transistor, wherein a black gray scale voltage is applied to the shielding electrode, and wherein the shielding electrode is connected with the data driver or the gate driver.

12. The display apparatus of claim 11, wherein the first substrate further comprises:
   a gate line arranged on the first base substrate;
   a data line insulated from the gate line and crossing the gate line;
   a plurality of switching devices each electrically connected to a respective gate line and a respective data line; and
   an insulating layer arranged on the switching devices and the data line,
   wherein the pixel electrodes are disposed on the insulating layer and electrically connected to the switching devices, respectively, and the shielding electrode is electrically insulated from the pixel electrodes and disposed on the insulating layer.

13. The display apparatus of claim 12, wherein the data line is disposed below the shielding electrode.

14. The display apparatus of claim 12, wherein the gate line is disposed below the shielding electrode.

15. The display apparatus of claim 12, wherein the switching devices are covered by the shielding electrode.

16. The display apparatus of claim 11, wherein the shielding electrode comprises a same material as the pixel electrodes.

17. The display apparatus of claim 11, wherein the electrophoretic layer comprises a plurality of microcapsules each comprising a transparent insulative liquid having a spherical shape, a plurality of first particles, and a plurality of second particles having a polarity different from a polarity of the first particles.

18. The display apparatus of claim 17, wherein the black gray scale voltage has the same polarity as a polarity of black-colored particles of the plurality of first particles or the plurality of second particles.

19. The display apparatus of claim 11, wherein the electrophoretic layer comprises a transparent insulative liquid, a plurality of first particles, a plurality of second particles having a polarity different from a polarity of the first particles, and a plurality of barrier walls.

20. The display apparatus of claim 19, wherein the shielding electrode receives a voltage having the same polarity as a polarity of black-colored particles of the first particles or second particles.

21. The display apparatus of claim 11, wherein the shielding electrode is electrically connected to the data driver to receive the black gray scale voltage having the same polarity as a polarity of black-colored particles of the first particles or the second particles.

22. A display apparatus comprising:
 a first substrate including a first base substrate and pixel electrodes disposed on the first base substrate, wherein at least one pixel electrode of the pixel electrodes is connected with a drain electrode of a thin film transistor disposed on the first substrate;
 a second substrate including a second base substrate and a common electrode disposed on the second base substrate;
 an electrophoretic layer disposed between the first substrate and the second substrate to display a gray-scale image; and
 a shielding electrode disposed between the pixel electrodes, the shielding electrode facing the common electrode with the electrophoretic layer interposed between the shielding electrode and the common electrode, the shielding electrode not connected with the drain electrode of the thin film transistor, wherein the shielding electrode is connected with a driver configured to drive the thin film transistor.

* * * * *